April 21, 1925.                                              1,534,760
L. BLACKMORE
VEHICLE BUMPER
Filed Nov. 30, 1923

Inventor
Lloyd Blackmore.

Patented Apr. 21, 1925.

1,534,760

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

VEHICLE BUMPER.

Application filed November 30, 1923. Serial No. 677,740.

*To all whom it may concern:*

Be it known that I, LLOYD BLACKMORE, a citizen of the United States, and a resident of Highland Park, county of Wayne, and State of Michigan, have invented certain new and useful Improvements in Vehicle Bumpers, of which the following is a full, clear, concise, and exact description, such as will enable others skilled in the art to which the invention relates to make and use the same, reference being made therein to the accompanying drawings which form a part of this specification.

This invention relates to safety devices, and is illustrated as embodied in a motor vehicle having a front bumper.

An object of the invention is to provide a double-bar spring bumper with a support of maximum strength and resilience, preferably by spacing the impact bars from a spring supporting bar by means of a spacing device slidably engaging the impact bars.

This and other objects and features of the invention, including various novel combinations of parts and desirable particular constructions, will be apparent from the following description of the illustrative embodiment shown in the accompanying drawings, in which Fig. 1 is a top plan view of the front end of an automobile having a bumper as described;

In the arrangement selected for illustration, the invention is embodied in an automobile having a radiator 10, a chassis frame including side members 12 and a cross member 14, and side fenders 16. In order to protect the radiator and fenders, a front bumper of novel form is provided.

Figure 1:
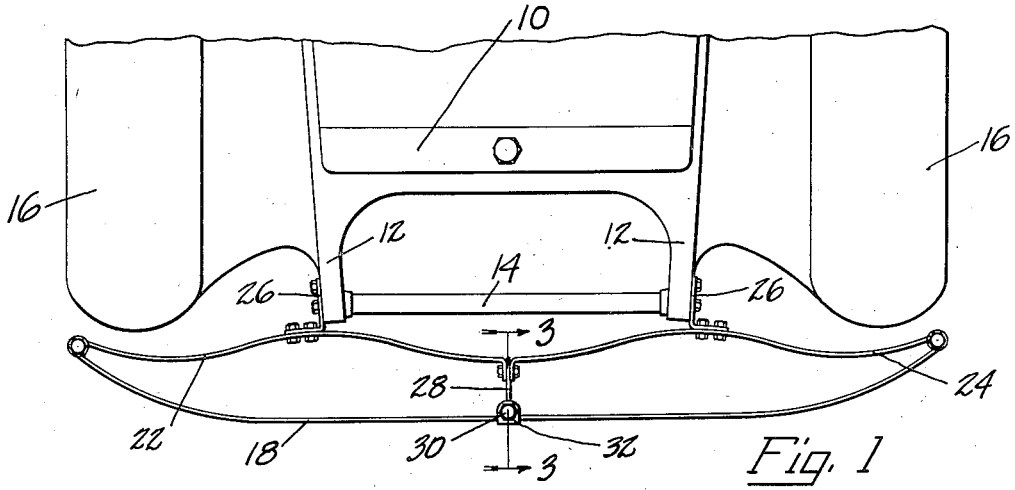
Figure 2:
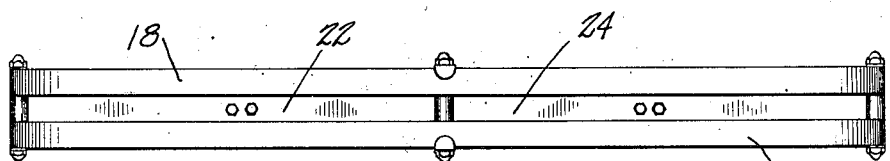
Fig. 2 is a front elevation of the bumper.
Figure 3:
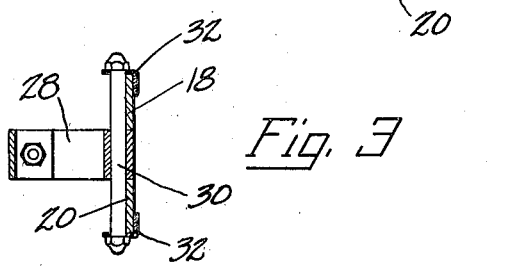
Fig. 3 is a vertical section on the line 3—3 of Fig. 1, showing the spacing device.

In the modification shown in Figs. 1–3, the bumper comprises vertically-spaced impact bars 18 and 20, having eyes at opposite ends embracing shackle bolts which connect them to horizontally-alined supporting bars 22 and 24 arranged opposite the space between the bars 18 and 20. A bracket 26 is bolted or otherwise secured to each of the bars 22 and 24 and to the corresponding side frame member 12. As shown in Figs. 1 and 3, the supporting bars 22 and 24 are forwardly flanged at their adjacent ends, and are secured by a bolt or otherwise to a member 28 forming part of a spacing device, and which is formed at its front end as an eye or sleeve between bars 18 and 20. A bolt 30 held by this eye draws hook-shaped clamping members 32 against the top of bar 18 and the bottom of bar 20, providing a sliding engagement with these bars.

Figure 4:
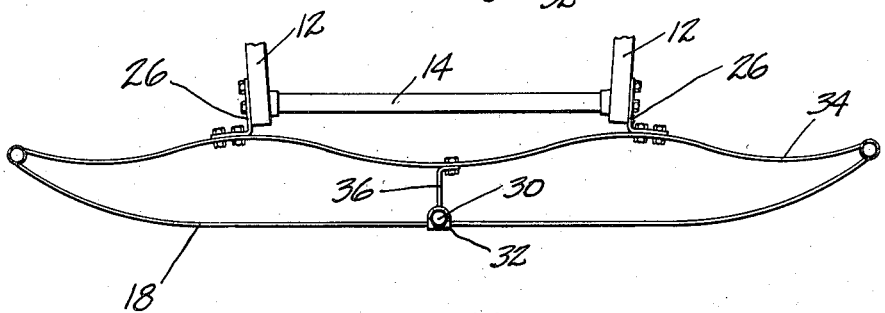
Fig. 4 is a view corresponding to Fig. 1, but showing a modification.

The modification shown in Fig. 4 differs from the one described above in that a single supporting bar 34 is substituted for bars 22 and 24, and an L-shaped member 36 bolted to its center is substituted for member 28.

In both modifications it will be seen that each supporting bar is bowed rearwardly at the point where it is secured to the frame, and is spaced at the center of the bumper a substantial distance from the impact bars, by a rigid connection 28 or 36 which engages a forwardly-bowed portion of the supporting bar or bars. This gives in effect the strength and resilience of an elliptic spring to all parts of the bumper.

While particular desirable embodiments of the invention have been described in detail, it is not my intention to limit its scope to those embodiments, or otherwise than by the terms of the appended claims.

I claim:

1. A vehicle having a chassis frame and a bumper, the bumper comprising, in combination, a pair of vertically-spaced parallel transverse spring impact bars, a spring supporting bar having its opposite ends arranged between and connected to the corresponding ends of the impact bars, means for attaching the supporting bar to the chassis frame, and a spacing device secured to the center of the supporting bar and extending a substantial distance forward and slidably engaging the impact bars.

2. A vehicle having a chassis frame and a bumper, the bumper comprising, in combination, a pair of vertically-spaced parallel transverse spring impact bars, a spring supporting bar consisting of a pair of alined spring supporting bars having opposite ends arranged between and connected to the corresponding ends of the impact bars, means for attaching the supporting bar to the chassis frame, and a spacing device secured between the adjacent ends of the supporting bars and extending a substantial distance forward and slidably engaging the impact bars.

3. A vehicle having a chassis frame and a bumper, the bumper comprising, in combination, a pair of vertically-spaced spring impact bars, a spring supporting bar horizontally spaced behind the impact bars and carried by the chassis frame, and a spacing device secured to the supporting bar and having a pair of clamps slidably engaging the impact bars.

4. A vehicle having a chassis frame and a bumper, the bumper comprising, in combination, vertically-spaced impact bars, a continuous supporting bar secured at its opposite ends to the impact bars and carried by the chassis frame, and a spacing device secured to the supporting bar and having a pair of clamps slidably engaging the impact bars.

5. A vehicle having a chassis frame and a bumper, the bumper comprising, in combination, a pair of vertically-spaced parallel transverse spring impact bars, a spring supporting means horizontally spaced between the ends of the impact bars and carried by the chassis frame, and a spacing device secured to the center of the spring supporting means and extending a substantial distance forward slidably engaging the impact bars.

In testimony whereof I affix my signature.

LLOYD BLACKMORE.